Figure 1:
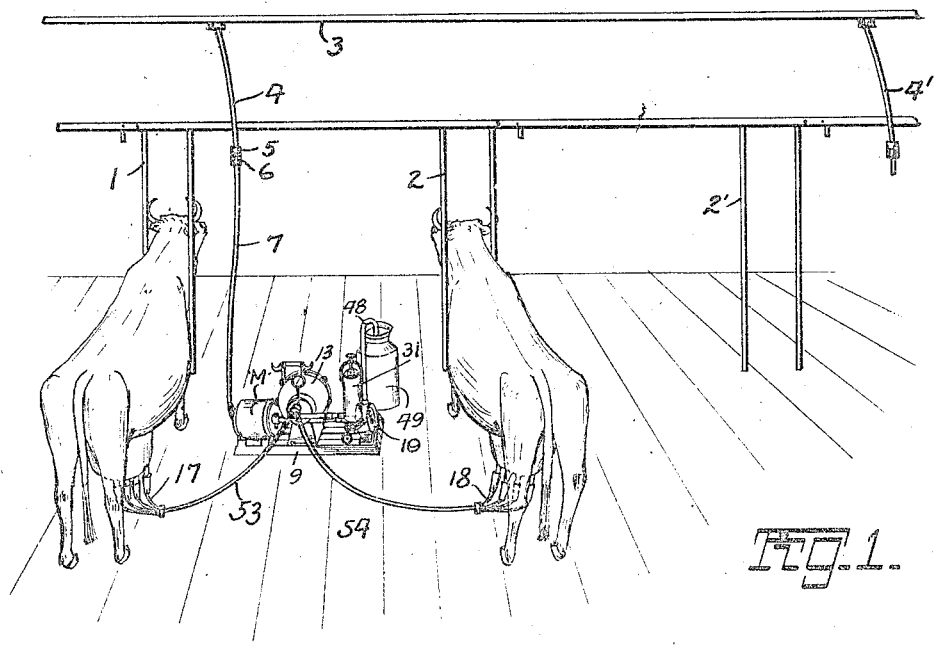

J. N. GILMAN.
MILKING MACHINE.
APPLICATION FILED APR. 26, 1915.

1,210,304.

Patented Dec. 26, 1916.
3 SHEETS—SHEET 1.

WITNESSES:

INVENTOR.
JAMES N. GILMAN.
BY
Carlos P. Griffin
ATTORNEY.

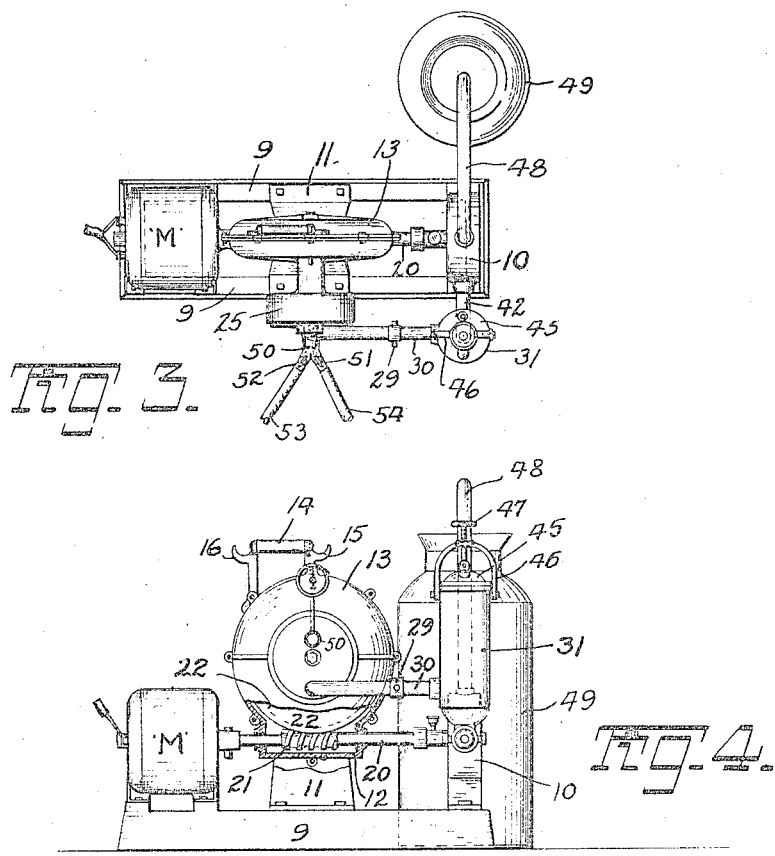

J. N. GILMAN.
MILKING MACHINE.
APPLICATION FILED APR. 26, 1915.

1,210,304.

Patented Dec. 26, 1916.
3 SHEETS—SHEET 3.

WITNESSES
Elbert R Browner
A. H. Kephart

INVENTOR.
JAMES N. GILMAN.
BY
Carlos P. Griffin
ATTORNEY.

UNITED STATES PATENT OFFICE.

JAMES N. GILMAN, OF BERKELEY, CALIFORNIA.

MILKING-MACHINE.

1,210,304.  Specification of Letters Patent.  Patented Dec. 26, 1916.

Application filed April 26, 1915. Serial No. 23,874.

*To all whom it may concern:*

Be it known that I, JAMES N. GILMAN, a citizen of the United States, residing at Berkeley, in the county of Alameda, State of California, have invented a new and useful Milking-Machine, of which the following is a specification in such full and clear terms as will enable those skilled in the art to construct and use the same.

This invention relates to a milking machine and its object is to provide an electrically driven machine which can be easily carried from place to place and capable of milking two cows at one time and delivering the milk either to a can placed near the milking machine or to a pipe line as may be desired.

An object of the invention is to allow the milk to be passed through the pump used for producing the vacuum, thereby maintaining an air seal at all times and at the same time to deliver the milk either into the can at the side of the machine or under sufficient pressure to elevate it into the milk house, if that is necessary.

Another object of the invention is to provide the machine with a mechanically operated pulsating device which will break the vacuum on the milking cups and give the necessary pulsation to effect the milking without breaking the vacuum on the pump itself, thereby reducing the amount of air handled by the pump during the milking operation.

Another object of the invention is to provide the machine with a vacuum chamber which will be of sufficient size to prevent the air which passes into the tubes leading to the cows from the pulsating device from disturbing the normal operation of the pump and milking machine, said vacuum chamber being provided with a safety valve to prevent the vacuum from becoming too high and thereby injuring the cows.

An embodiment of the invention is shown in the drawing in which the same reference numeral is applied to the same portion throughout, but I am aware that there may be many modifications thereof.

Figure 2:
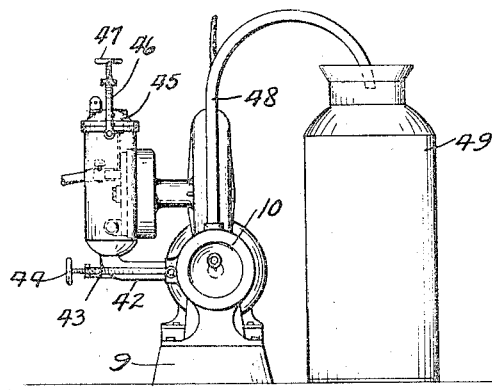
Figure 6:
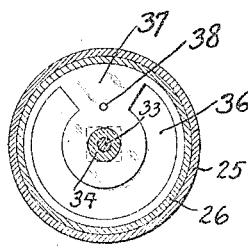
Figure 7:
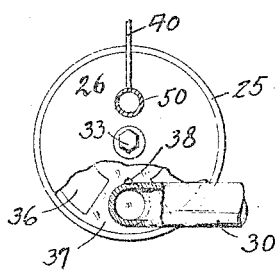
Figure 8:
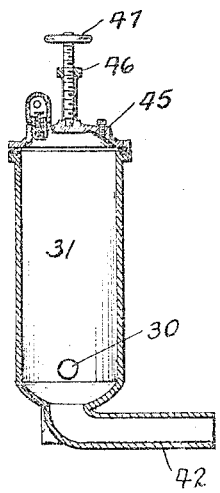
Figure 9:
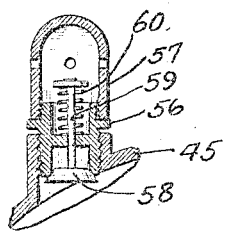

Figure 1 is a perspective view of the milking machine in use showing the position of the cows, the milking machine and the power line for supplying the electricity to the motor, Fig. 2 is an end view of the milking machine showing the can adjacent to the same, Fig. 3 is a plan view of the complete milking machine showing the can at the side of the same, Fig. 4 is a side elevation of the milking machine a portion of the gear casing being broken away for purposes of illustration, Fig. 5 is a vertical sectional view through the pulsator and driving gear, Fig. 6 is a vertical sectional view through the pulsator on the line 6—6, Fig. 5, Fig. 7 is a side elevation of the pulsator casing, a portion thereof being broken away for the purpose of showing that the small opening used for breaking the vacuum does not break the vacuum on the pump line, Fig. 8 is a vertical sectional view through the vacuum chamber and safety valve, and Fig. 9 is a vertical sectional view of the safety valve on a larger scale than Fig. 8.

The numerals 1, 2 and 2′ indicate the stanchions for the cows, 3 indicating the cable for supplying the drop cords 4 and 4′ between every second pair of cows with power, said drop cords having a socket 5 which connects with a socket 6 to supply the motor cable 7 with power. The motor is indicated at M and is mounted on a base 9, said base having a rotary pressure pump 10 mounted at its opposite end. At the center of the base there is a support 11 for the gear box 12, said gear box having a cover portion 13 with a handle 14 and hooks 15 and 16 to support the two sets of milking cups 17 and 18 when they are not in use.

The gear box has suitable journals for the shaft 20, which shaft is an extension of the motor shaft, and it carries a worm 21, said worm being in mesh with a worm wheel 22 journaled in opposite sides of the gear box on the shaft 23, said shaft having a squared end 24 for driving the pulsator. At the side of the gear box there is a casing 25 within which a cup or casing 26 is inserted. This casing is provided with an inlet pipe 27 and outlet pipe 28, the latter having a suitable coupling 29 for connecting it with the pipe 30 leading to the vacuum chamber 31.

The casing 26 has a wear plate 32 secured thereto by means of a bolt 33, which wear plate has a boss 34 to form a centering device for the pulsator runner 35. The pulsator runner has a channel 36 extending part way around its face and it has a portion 37 which rubs on the wear plate 32, a small hole 38 being provided to break the vacuum on the pipe 27 once during each rotation of the runner and a hole 39 being provided in the casing 25 to allow the air to have access to the runner.

A small pipe 40 on which is mounted a gage 41 is connected with the pipe 27 to show the operating conditions of the apparatus.

The vacuum receptacle has a pipe 42 extending out of the bottom thereof and connected with the pump 10, said pump being of any well known form of the so-called rotary pressure blowers. The vacuum pipe and vacuum chamber are connected to the pump by means of a clamp 43 and hand screw 44, while the cover 45 of the vacuum receptacle is secured to the receptacle 31 by means of the clamp 46 and hand screw 47.

Extending away from the pump casing is a pipe 48 which may either be led into the milk can 49 or may be connected with a suitable pipe line leading to a place of discharge for the milk as may be desired.

The pipe 27 has a connection 50 thereon with branches 51 and 52 to which the tubes 53 and 54 extending to the milking cups 17 are placed. The cover 45 of the vacuum chamber is provided with a plug 56 having a cover 57 thereon and having a valve 58 mounted on a stem 59 extending through said plug, a spring 60 being used to regulate the pressure within the vacuum chamber, it being well known in the art that to prevent injuring the cows the pressures used must be controlled within narrow limits.

The operation of the apparatus is as follows: The can and machine being placed in a convenient location, the motor is started and the teat cups are then placed on the cows' teats. As the motor operates the pump the pulsator runner rotates at a much lower rate of speed because of the worm gear driving it and each time the opening 38 passes the end of the pipe 27 it releases the vacuum in the tubes 53 and 54 thereby giving the necessary pulsating effect to milk the cows, while as the milk is drawn from the cows it passes through the vacuum chamber and pump and is delivered into the cans.

An especial advantage of this machine lies in the fact that the milk passes through the pump, thereby always keeping the pump properly primed so that no trouble is had in maintaining the necessary vacuum, the pump serving the double purpose of handling the milk and maintaining the vacuum.

Having thus described my invention what I claim as new and desire to secure by Letters Patent of the United States, is as follows, modifications within the scope of the claims being expressly reserved:

1. A milking machine comprising a base, a motor thereon, a pump connected with the motor, a vacuum chamber adjacent the pump, a pulsator casing supported on the base, a pulsator in said casing, a pipe extending from the pulsator casing to the vacuum chamber, vacuum milking cups, a tube extending from the milking cups to the pulsator casing, the milk from the milking cups passing through the pulsator, vacuum chamber and pump, and a discharge pipe extending from said pump to a suitable receptacle for the milk.

2. A milking machine comprising a base, a motor thereon, an air pump operated by the motor, a pulsator casing, a rotary pulsator therein adapted to break the vacuum intermittently, a pipe extending from said pulsator casing to a series of vacuum milking cups, a vacuum chamber, a pipe connecting the pulsator casing and vacuum chamber, a pipe connecting the vacuum chamber and pump, a discharge pipe extending from the pump to a suitable receptacle for the milk, the pulsator casing having an opening whereby the vacuum in the milking cups may be broken without breaking the vacuum in the pipe leading to the vacuum chamber.

3. A milking machine comprising a base, a motor thereon, a pump operated by the motor and directly connected therewith, a vacuum chamber connected with the pump, an inwardly opening valve to determine the pressure within the vacuum chamber, a pulsator casing, a pipe connecting the pulsator casing and vacuum chamber, a revoluble pulsator within the casing having an opening therethrough to break the vacuum in the pipe to which the milking tubes are to be connected without breaking the vacuum in the vacuum chamber, mechanical means to rotate said pulsator, a series of milking cups having suitable pipe connections with the pulsator, and a discharge pipe connected with the pump for discharging the milk into a suitable receptacle.

4. A milking machine comprising a base having a motor thereon, a vacuum pump operated by said motor, a vacuum chamber connected with the pump, a pulsator casing, milking cups, a tube extending from the milking cups to the pulsator casing, a pipe extending from the pulsator casing to the vacuum chamber, and a mechanically operated rotary disk in the pulsator casing having a channel to deliver the milk from the milking cups to the vacuum chamber and also having an opening therein to break the vacuum in the milking cups once during each revolution of the disk without breaking the vacuum in the vacuum chamber, the milk passing from the pulsator to the vacuum chamber and then to the pump.

In testimony whereof I have hereunto set my hand this 17th day of April, A. D. 1915, in the presence of the two subscribed witnesses.

JAMES N. GILMAN

Witnesses:
C. P. GRIFFIN,
JAMES MASON.